United States Patent
Greenspan et al.

[11] 3,719,504
[45] March 6, 1973

[54] MEAT TENDERIZER

[75] Inventors: Joseph Greenspan, Evergreen Park, Ill.; Clay E. Hawkins, Springfield, Mo.

[73] Assignee: Frigidmeats, Inc., Chicago, Ill.

[22] Filed: Sept. 24, 1971

[21] Appl. No.: 183,531

[52] U.S. Cl. ................................. 99/353, 17/25
[51] Int. Cl. .................................................. A22c 9/00
[58] Field of Search ........ 99/254, 253, 255, 256, 257, 99/353, 107–108, 159; 17/25, 26, 27, 28, 29, 30, 31

[56] References Cited

UNITED STATES PATENTS

| 681,266 | 8/1901 | Roop | 99/254 R UX |
|---|---|---|---|
| 2,645,172 | 7/1953 | Allbright et al. | 99/257 |
| 2,674,179 | 4/1954 | Harrington | 99/257 |
| 2,816,320 | 12/1957 | Brown | 17/25 |
| 2,841,818 | 7/1958 | Griffith | 17/25 |
| 3,016,004 | 1/1962 | Harper, Jr. et al. | 99/255 |
| 3,347,679 | 10/1967 | Nordin | 17/26 |
| 3,535,734 | 10/1970 | Ross | 17/25 |
| 3,565,639 | 2/1971 | Schack et al. | 99/255 X |
| 3,576,158 | 4/1971 | Greenspan et al. | 99/254 R |
| 3,661,072 | 5/1972 | Allinquant et al. | 99/256 |

Primary Examiner—Billy J. Wilhite
Assistant Examiner—Arthur O. Henderson
Attorney—James M. Wetzel

[57] ABSTRACT

A meat tenderizing device for expeditiously tenderizing meat pieces regardless of the size, shape or surface configuration of the meat. The meat tenderizing device includes a framework carrying an endless conveyor which has a continuous movement so that meat pieces traveling thereon can be processed by the tenderizing device at an optimum rate. Aperturing means positioned on the framework is operable in synchronization with the continuous conveyor movement to accomplish perforation of the meat pieces passing thereunder. A liquid dispensing means positioned on the framework means applies a liquid tenderizing solution to the top and bottom surfaces of the meat pieces immediately after their perforation. The continuous movement of the meat pieces allows the liquid dispensing means to apply the liquid tenderizer in a uniform pattern. In this regard, large orificed nozzles are utilized with the distributing means so that clogging is eliminated. A liquid distributing means is positioned on the framework means to evenly distribute the tenderizing solution on the top surface of the meat pieces and to remove the unabsorbed tenderizing solution therefrom. In this manner, a greater volume and a better quality of meat processing is accomplished.

9 Claims, 4 Drawing Figures

MEAT TENDERIZER

BACKGROUND OF THE INVENTION

This invention relates in general to meat tenderizing devices of the type described in my prior U.S. Pat. No. 3,576,158, granted Apr. 27, 1971. More particularly, this invention relates to novel aperturing means for a meat tenderizing device.

In my prior patent, identified above, a meat tenderizing device was disclosed which expeditiously processed meat pieces and insured a complete and even tenderizing treatment of all meat pieces processed regardless of the size, shape or surface configuration of the meat. The prior meat tenderizing device included a framework upon which was positioned an endless conveyor adapted to incrementally move meat pieces under a group of reciprocally driven aperturing pins. The aperturing pins were synchronized with the incremental movement of the conveyor so that they moved downward and perforated the meat at every incremental stop. A sprayer assembly applied a pattern of tenderizing solution to the top and bottom surfaces of the meat pieces after they were apertured. The tenderizing solution was then evenly distributed and the unabsorbed tenderizing solution removed by a blower assembly. The endless conveyor continued to incrementally advance the meat pieces until they were discharged from the meat tenderizing device.

The meat tenderizing device described in my prior patent enjoyed tremendous commercial success. However, the incremental movement of the conveyor decreased the speed with which the meat prices could be processed. That is, the conveyor had to stop to allow the aperturing process to be performed and, thus, the meat pieces did not continuously move through the tenderizing device. Also, a fully uniform application of the liquid tenderizer on the meat pieces could not be accomplished due to the incremental movement of the conveyor. To protect against over-application of the tenderizing solution when the meat pieces were not moving, small orificed nozzles had to be used on the sprayer assembly so that only a fine spray was applied. The small nozzles had an occasional tendency to clog because of minute meat pieces in the recirculation system.

SUMMARY OF THE INVENTION

Accordingly, it is an object of the present invention to provide a meat tenderizing device containing aperturing means of a novel construction that can perforate continuously moving meat pieces. It is another object of the invention to provide an endless conveyor having a continuous movement. It is still a further object of the invention to provide nozzles for the sprayer assemblies that will provide a uniform application of tenderizing solution and that are non-clogging.

The foregoing and other objects are realized in accordance with the invention by providing a meat tenderizing device including a framework carrying an endless conveyor which has a continuous movement so that meat pieces traveling thereon can be processed by the tenderizing device at an optimum rate. Aperturing means positioned on the framework is operable in synchronization with the continuous conveyor movement to accomplish perforation of the meat pieces passing thereunder. A liquid dispensing means positioned on the framework means applies a liquid tenderizing solution to the top and bottom surfaces of the meat pieces immediately after their perforation. The continuous movement of the meat pieces allows the liquid dispensing means to apply the liquid tenderizer in a uniform pattern. In this regard, large orificed nozzles are utilized with the distributing means so that clogging is eliminated. A liquid distributing means is positioned on the framework means to evenly distribute the tenderizing solution on the top surface of the meat pieces and to remove the unabsorbed tenderizing solution therefrom. In this manner, a greater volume and a better quality of meat processing is accomplished.

DESCRIPTION OF THE PREFERRED EMBODIMENT

Figure 1:
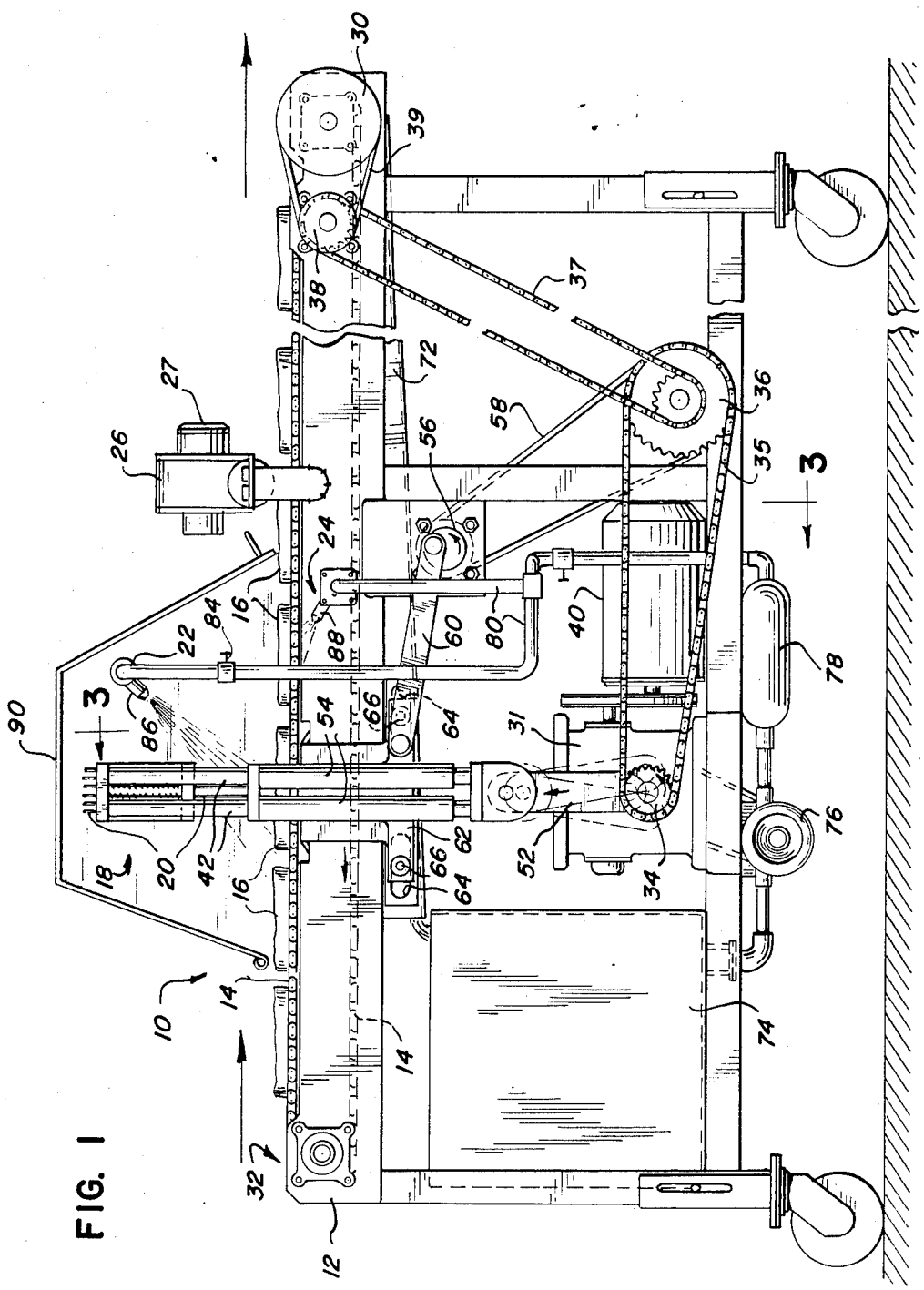
FIG. 1 is a side view of a meat tenderizing device embodying the features of the present invention.
Figure 2:
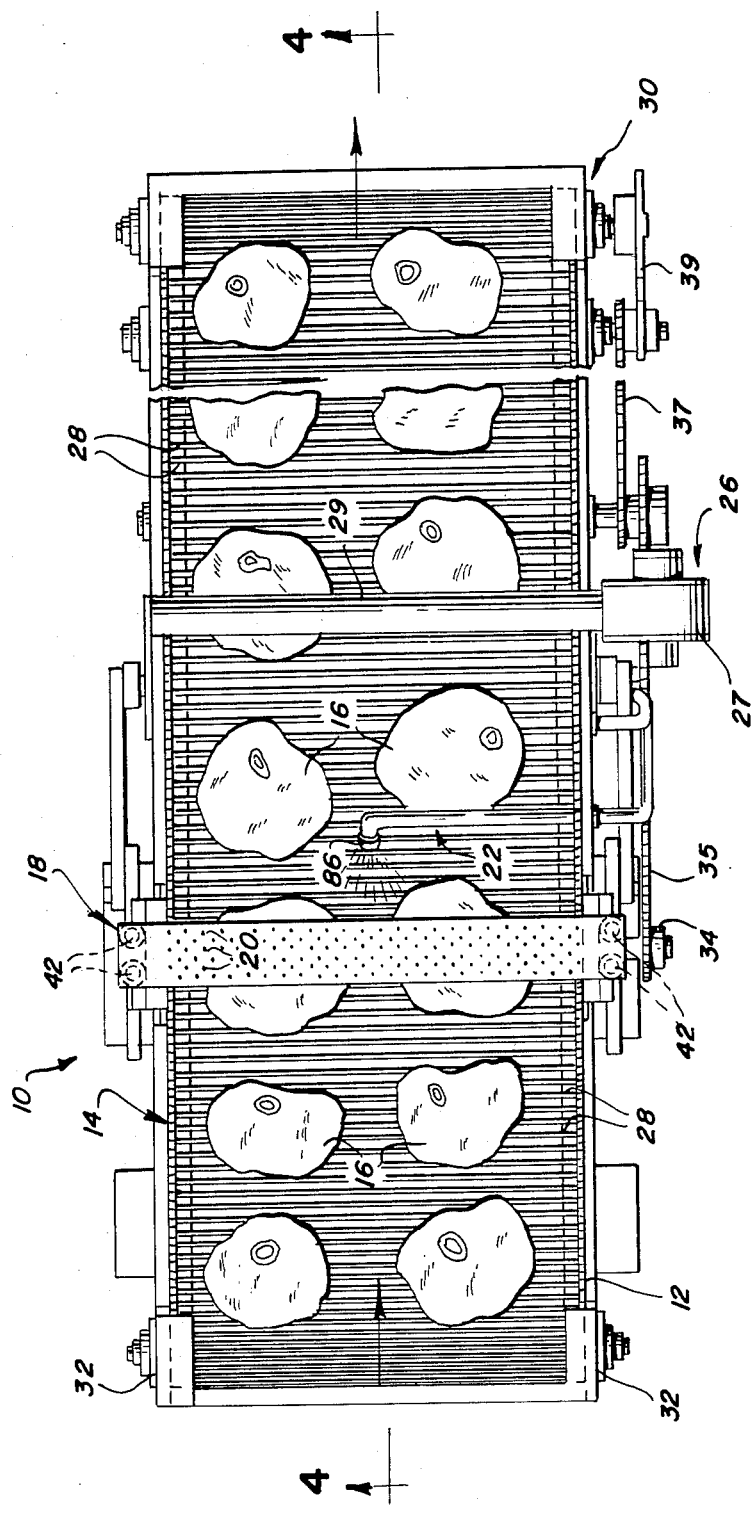
FIG. 2 is a top plan view of the meat tenderizing device of FIG. 1.

Referring now to the drawings, a meat tenderizing device embodying the preferred features of the present invention is illustrated at 10. The meat tenderizing device 10 includes a framework means 12 carrying an endless conveyor 14 having a continuous movement so that meat pieces 16 traveling thereon pass through the tenderizing device 10 at an optimum rate. An aperturing means 18 is positioned on the framework means 12 and is comprised of a plurality of pins 20. The pins 20 reciprocally move in both a horizontal direction and a vertical direction simultaneously in synchronization with the continuous movement of the conveyor 14 and, thus, perforate the meat pieces 16 being carried thereon. Immediately after perforation the meat pieces 16 are subjected to a liquid dispensing means comprised of an upper spray assembly 22 and a lower spray assembly 24. The spray assemblies 22, 24 are positioned on the framework means 12 to apply liquid meat tenderizing solution to the top and bottom surfaces of the meat pieces 16. The tenderizing solution is evenly distributed on the top surfaces of the meat pieces 16 by a liquid distributing means 26 positioned above the conveyor 14. The liquid distributing means 26 also removes any unabsorbed tenderizing solution from the meat pieces 16. The conveyor 14 ultimately discharges the meat pieces 16 from the meat tenderizing device 10 as fully tenderized pieces of meat with no further tenderizer processing required.

Considering the meat tenderizing device 10 in more detail, and referring to FIGS. 1 through 4, the meat tenderizing device 10 includes a framework means 12 carrying an endless conveyor 14 constructed of a plurality of transverse bars 28. The bars 28 are constructed in a spaced-apart relationship so as to give the conveyor 14 flexibility and provide substantial openings in the conveyor 14 so that the bottom surface of the meat pieces 16 carried thereon are nearly entirely exposed. The conveyor 14 is slidably supported at its outer edges on the framework means 12 and is driven with a continuous movement by a driving sprocket 30 positioned at one end. The opposite end of the conveyor 12 is supported by a guiding sprocket 32. The driving sprocket 30 is driven by a roller chain 39 actuated by a drive motor 40 through a reducer 31 and sprockets 34, 36 and 38 interconnected by roller chains 35 and 37, respectively. The drive motor 40 and the respective driven sprockets and roller chains are positioned below the conveyor 14 for sanitary reasons.

Figure 3:
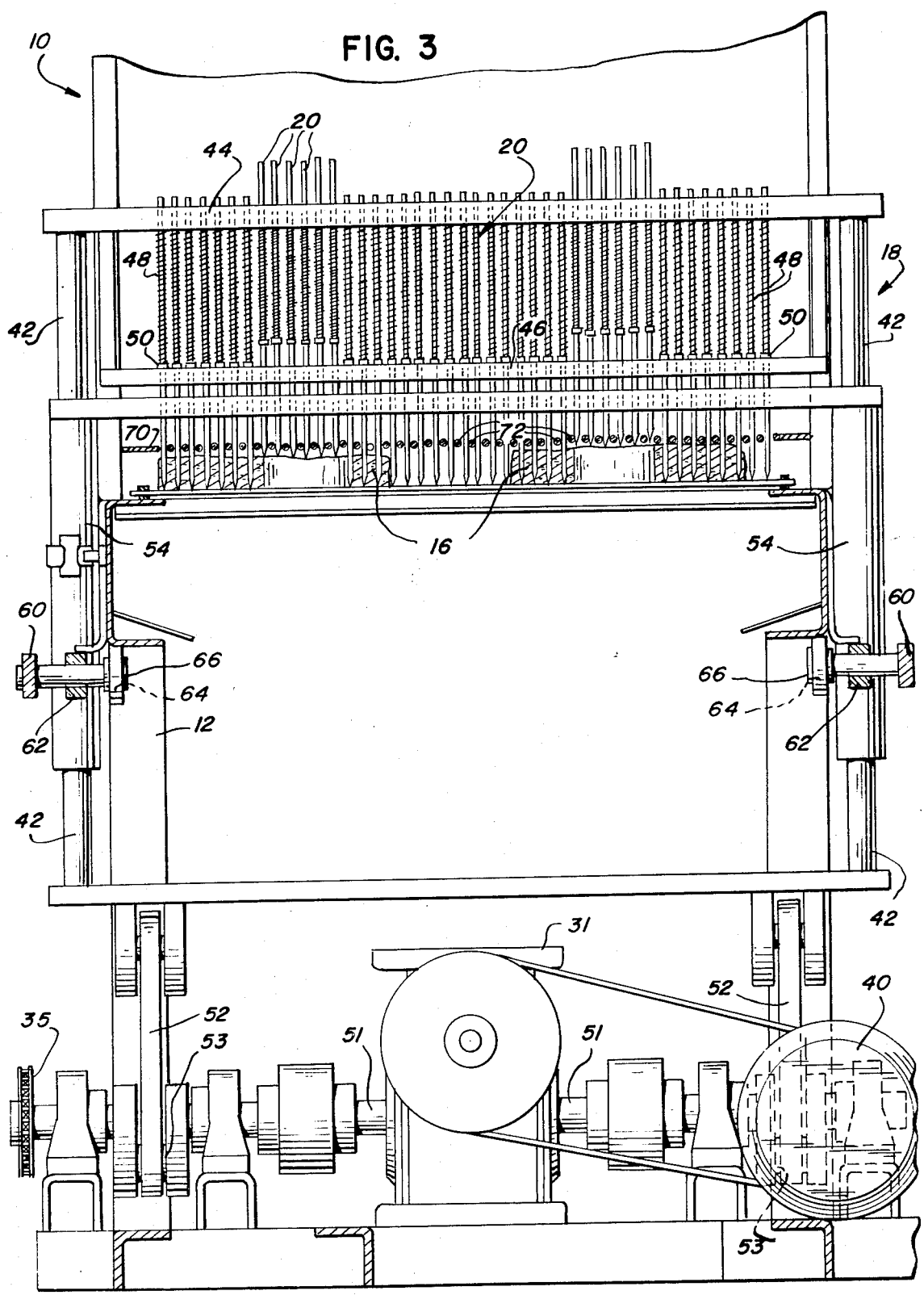
FIG. 3 is a front cross-sectional view taken along line 3—3 of FIG. 1.
Figure 4:
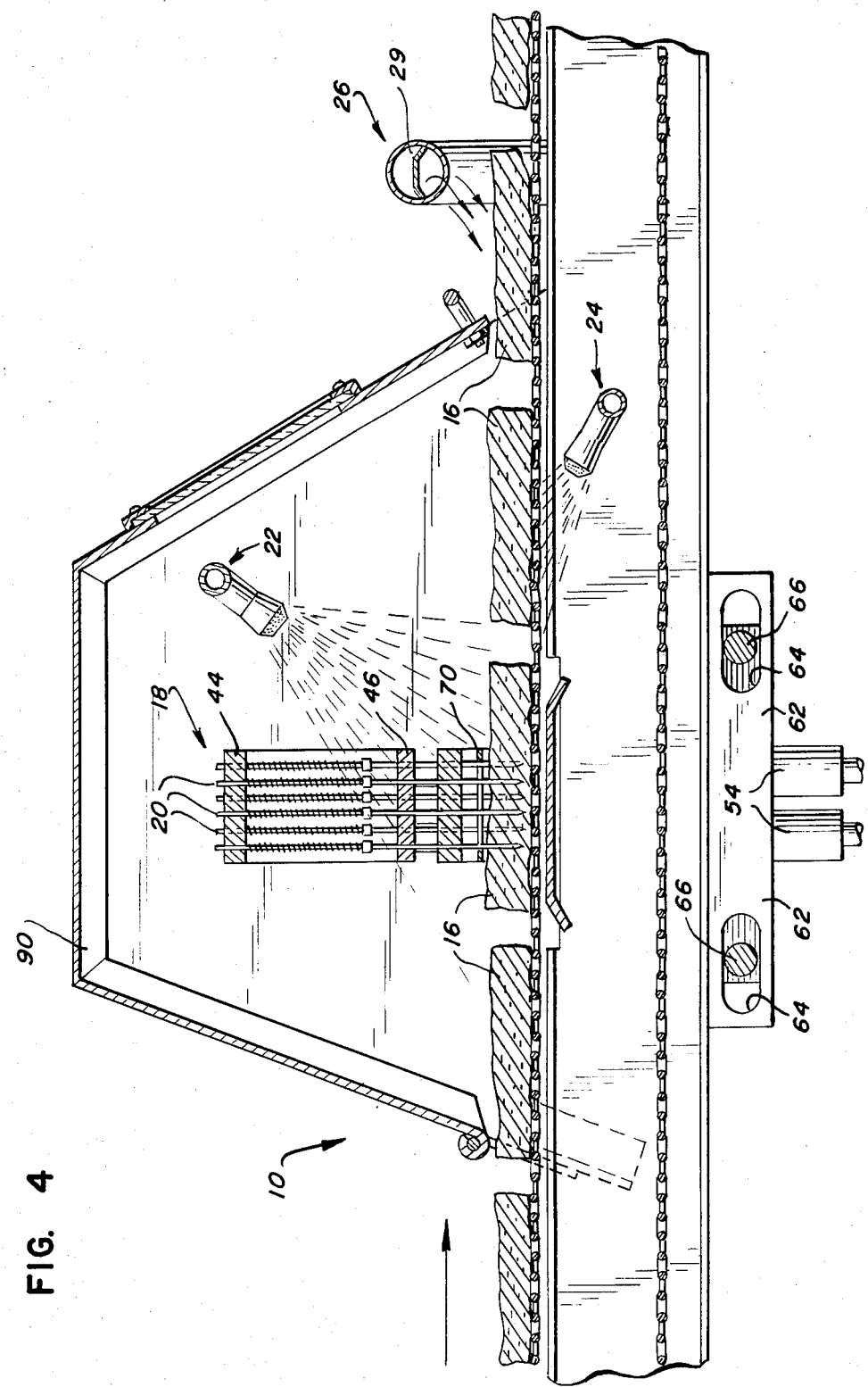
FIG. 4 is a cross-sectional view taken along line 4—4 of FIG. 2.

The aperturing means 18 is comprised of a plurality of elongated pins 20 which transverse the conveyor 14 and are supported thereabove by supporting rods 42 located on opposite sides of the framework means 12. As illustrated in FIGS. 3 and 4 the pins 20 are slidably retained between an upper plate 44 and a lower plate 46. Each of the pins 20 is biased in a downwardly direction so as to extend through the plate 46 and have a coil spring 48 disposed between the upper plate 44 and a bushing 50. Each bushing 50 is secured to the pins 20 so that when it rests on the top surface of the lower plate 46 the ends of the pins 20 are disposed in a common horizontal plane.

The aperturing means 18 is operated to reciprocally translate in a vertical direction so as to perforate the meat pieces 16. The aperturing means 18 is guided to translate vertically by tubular members 54 in response to the rotation of a crank shaft 51. The crank shaft 51 is operably connected to the motor 40 through the reducer 31 and has offset journals 53 thereon. Connecting rods 52 are secured between the journals 53 and the aperturing means 18. As the crank shaft 51 rotates the connecting rods 52 urge the aperturing means 18 to reciprocally translate in a vertical direction.

The aperturing means 18 is also operated to reciprocally translate in a horizontal direction simultaneously with the vertical translation. The horizontal translation is in synchronization with the conveyor 14 so that the aperturing means 18 travels at the same rate of speed as the conveyor 14. This is accomplished by having the aperturing means 18 move in response to the rotation of a crank shaft 55 which is operably connected to the motor 40. The crank shaft 55 has connecting rods 56 attached at each end in offset positions from the center. The opposite ends of the connecting rods 56 are attached to flanges 62 which are formed on the tubes 54. Each flange 62 has cam openings 64 formed therein which ride on cam followers 66 attached to the framework means 12. The aperturing means 18 is guided to translate horizontally by the cam openings 64 riding on the cam followers 66 when urged by the connecting rods 56 in response to the rotation of the crank shaft 55. Thus, as the crank shaft rotates the connecting rods 56 urge the aperturing means 18 to reciprocally translate in a horizontal direction in synchronization with the movement of the conveyor 14.

In operation, the aperturing means 18 functions in a cycle which comprises a vertically downward translation toward the conveyor 14 to perforate the meat pieces 16. The vertical translation of the aperturing means 18 momentarily pauses to convert to an upward movement and during this pause the aperturing means 18 translates horizontally in synchronization with the conveyor 14. Thus, the aperturing means 18 translates horizontally while perforating the meat pieces 16. The horizontal translation of aperturing means 18 momentarily pauses to convert to a reverse movement and during this pause the aperturing means 18 translates vertically upward withdrawing from the meat pieces 16. The upward vertical translation of the aperturing means 18 momentarily pauses to again begin its downward cycle to perforate the meat pieces 16 and during this pause the aperturing means translates oppositely from the movement of conveyor 14 so as to be positioned over unperforated meat.

The lowermost vertical driven position of the aperturing means 18 positions the pins 20 spaced above the surface of the conveyor 14 so that they extend through the upper surface of the meat substantially but not entirely therethrough. Each pin 20 is sufficiently biased by the coil spring 48 to have enough force to perforate the fibers of the meat pieces. However, a pin 20 which encounters a bone or other obstruction will be forced upwardly so that the spring 48 is compressed and the pin 20 recedes through the upper plate 44. The lower ends of the pins 20 are preferably tapered to a rounded point and the diameters of the pins is preferably not larger than one-fourth of an inch. Such dimensions are suitable for perforating the meat pieces 16 so that the perforations will be self-closing. Thus, there is no visible change in the appearance of the meat pieces 16 once it has been treated.

The pins 20, as best illustrated in FIGS. 3 and 4, are grouped together in an even, closely spaced apart relationship over a rectangular area extending the full width of the conveyor 14. The aperturing means 18 translates in the vertical and horizontal directions in such a manner that the entirety of each of the meat pieces 16 placed on the conveyor 14 is evenly perforated. That is, the pins 20 pierce the meat pieces 16 directly behind the area last perforated by the previous translating cycle of the aperturing means 18. Thus, all meat pieces placed on the conveyor 14 are evenly perforated and the feeding of the meat into the machine 10 is not critical. As the movement of the conveyor 14 is synchronized with the vertical and horizontal translation of the aperturing means 18 the machine 10 may be operated at various production rates with the maximum preferable speed for the aperturing means 18 being 120 strokes per minute at which the conveyor 14 moves at 30 feet per minute.

A stripper 70 is provided in association with the pins 20 so that the meat pieces 16 are held down on the conveyor 14 when the pins 20 are withdrawn. The stripper 70 ensures that all of the meat and bone material is stripped from the pins 20 so that no damage results to the pins 20. The stripper 70 is preferably a comb-like member attached to the framework means 12 and has a plurality of teeth 72 which project horizontally between the pins 20. The forward edge of the stripper 70 angles upward slightly and, thus, readily allows the meat pieces 16 to pass thereunder.

Referring to FIG. 1, it may be seen that there is a recirculating system provided for the liquid meat tenderizing solution. A drip pan 72 underlies both flights of the conveyor 14 and has one end engaged in a storage tank 74. The storage tank 74 retains for recirculation the unabsorbed liquid tenderizer collected by the drip pan 72. Thus, the drip pan 72 extends from the storage tank 74 under the conveyor 14 and ends at the sprocket 30. The liquid tenderizer is recirculated from the tank 74 to the upper and lower spray assemblies 22,24 by the pump 76. The pump 76 pumps the liquid tenderizer under pressure to the upper and lower spray assemblies through filters 78 and through fluid lines 80. Valves 82 and 84 are in the fluid lines 80 so as to control the rate of flow of liquid tenderizing solution which issues from the upper and lower spray assemblies.

Considering the upper spray assembly 22, it will be appreciated that it may comprise one or more spray nozzles, although in the preferred embodiment a single nozzle 86 is employed. It has been found that controlled spraying, as opposed to immersing or flooding the meat with tenderizing solution, provides a more even and accurate control over the distribution of the tenderizer and over the liquid absorption of the meat. The amount of meat tenderizer which may be absorbed in the meat is quite critical and must be carefully controlled. The meat pieces 16 are preferably perforated when in a semi-plastic state between 22°F and 31°F. Such a procedure allows the desired amount of liquid tenderizer to be absorbed. The desired amount of tenderizer is controlled by government regulation which specifies 3 pounds of tenderizer to 100 pounds of meat or 3 percent absorbed tenderizer.

A suitably accurate uniform coverage spray nozzle 86 for the upper spray assembly 22 may be a commercially available unit which has a large enough orifice therein so as not to get clogged by the recirculating solution which contains meat pieces escaping the filters 78. The nozzle 86 should produce a diverging spray pattern covering the full width of the conveyor evenly. Thus, the meat tenderizing solution is sprayed onto the upper surfaces of the meat pieces 16 on the conveyor immediately after the meat pieces 16 have been perforated and before the perforations in the meat have closed, thereby enabling the meat tenderizing liquid to enter the perforations and to provide tenderizing solution throughout the interior of the meat.

The lower spray assembly 24 may also be comprised of one or more spray nozzles. However, in the preferred embodiment the lower spray assembly 24 is comprised of three separate spray nozzles 88 which are spaced below the conveyor 14 and spray upwardly therethrough so as to spray the bottom surface of the meat pieces 16. The nozzles 88 of the lower spray assembly 24 may also be commercially available units which will have a large enough orifice to provide for a non-clogging system.

The meat tenderizing device 10 is provided with a hood 90 which is positioned on the framework means. The hood 90 encloses the upper and lower spray assemblies 22, 24 and the aperturing means 18 to prevent the spattering of liquid tenderizer or bone chips. The hood 90 is hinged to enable it to be folded back and expose the enclosed parts.

The liquid distributing means 26 fully described in my prior U.S. Pat. No. 3,576,158, is comprised of a blower 27 having a large cylindrical air conduit 29 extending across and spaced above the conveyor 14. The distributing means 26 is positioned behind the spray assemblies 22, 24 and above the drip pan 72. The function of the distributing means 26 is to blow all of the unabsorbed liquid meat tenderizing solution from the upper surface of the meat pieces 16 immediately after the meat pieces 16 have had tenderizing solution applied thereon. This operation prevents over absorption of the tenderizer which will occur due to the solution lying in pools on the meat pieces 16.

Considering the operation of the meat tenderizing device 10, it may be seen that the process performed thereby is fully automatic. The meat pieces 16 may be randomly placed on the forward end of the conveyor 14 in any suitable manner and regardless of the thickness, size or bone configuration of the meat. The meat pieces 16 are automatically and continuously advanced by the conveyor 14 under the aperturing means 18 where they are held down by the stripper 70 and evenly perforated by the pins 20 which operate together as a group in synchronization with the continuous movement of the conveyor 14. Complete aperturing of the meat pieces 16 is provided. As the meat pieces 16 are advanced from underneath the aperturing means 18 they are showered with a controlled spray of meat tenderizing solution from the upper and lower spray assemblies 22, 24. Such spraying occurs prior to the closing of the perforations in the meat pieces 16. The meat pieces 16 proceed with a continuous movement to be passed underneath the distributing means 26 where a high velocity air stream evenly distributes the unabsorbed liquid over the upper surface of the meat pieces 16 and removes any excess solution. The open mesh construction of the conveyor 14 allows all of the excess solution to drip through the conveyor 14 onto the drip pan 72 where it is recaptured and returned to the storage tank 74 to be recirculated. The meat pieces 16 are then automatically discharged by the conveyor 14 from the meat tenderizing device 10 fully treated.

While the preferred embodiment of the present invention has been shown and described herein, it is obvious that many structural details may be changed without departing from the spirit and scope of the appended claims.

We claim:

1. An apparatus for tenderizing meat comprising:
   a. framework means;
   b. conveyor means positioned on said framework means to move meat pieces through said tenderizing apparatus at a continuous uninterrupted rate;
   c. aperturing means positioned on said framework means to reciprocally move in both a vertical direction and a horizontal direction simultaneously and thereby perforate said meat pieces;
   d. liquid dispensing means positioned on said framework means to apply liquid meat tenderizing solution to said meat pieces; and
   e. liquid distributing means positioned on said framework means to evenly distribute said liquid meat tenderizing solution on said meat pieces and remove unabsorbed liquid meat tenderizing solution from said meat pieces.

2. A meat tenderizing apparatus in accordance with claim 1 wherein said aperturing means comprises a plurality of evenly spaced pins traversing said conveyor means.

3. A meat tenderizing apparatus in accordance with claim 1 wherein said conveyor means and said aperturing means are operable from a common motor and have synchronized movements.

4. A meat tenderizing apparatus in accordance with claim 1 wherein said aperturing means moves in said vertical direction toward and away from said conveyor means.

5. A meat tenderizing apparatus in accordance with claim 1 wherein said aperturing means moves in said horizontal direction so that movement in one direction is contiguous with said conveyor movement and with said meat pieces and movement in the other direction directly opposes said conveyor movement so as to transverse said meat pieces.

6. An apparatus for tenderizing meat comprising:
   a. framework means;
   b. conveyor means positioned on said framework means to move meat pieces through said tenderizing apparatus at a continuous uninterrupted rate;
   c. aperturing means positioned on said framework means to reciprocally translate in a vertical direction between an upper position and a lower position and to simultaneously reciprocally translate in a horizontal direction between a forward position and a rear position, said aperturing means being adjacent said conveyor means when in said lower position so as to perforate said meat pieces, said aperturing means being in synchronization with said conveyor movement so as to move from said forward position to said rear position while perforating said meat pieces in said lower position, said aperturing means translating from said lower position to said upper position when in said rear position so as to withdraw from said meat pieces and said aperturing means translating from said rear position to said forward position while in said upper position.
   d. liquid dispensing means positioned on said framework means to apply liquid meat tenderizing solution to said meat pieces; and
   e. liquid distributing means positioned on said framework means to evenly distribute said liquid meat tenderizing solution on said meat pieces and remove unabsorbed liquid meat tenderizing solution from said meat pieces.

7. A meat tenderizing apparatus in accordance with claim 6 wherein said conveyor means is an endless belt.

8. A meat tenderizing apparatus in accordance with claim 6 wherein said aperturing means comprises a plurality of evenly spaced pins traversing said conveyor means.

9. A meat tenderizing apparatus in accordance with claim 6 wherein said aperturing means translates in said vertical and horizontal directions so as to evenly perforate the entirety of said meat pieces placed on said conveyor means.

* * * * *